May 1, 1956  S. G. JOHNSON  2,743,738
VALVE-TWO-WAY
Filed March 4, 1952

INVENTOR
SAMUEL G. JOHNSON
Paul O. Rippel
ATT'Y

United States Patent Office 2,743,738
Patented May 1, 1956

2,743,738

VALVE—TWO-WAY

Samuel G. Johnson, Fort Wayne, Ind., assignor to International Harvester Company, a corporation of New Jersey Application March 4, 1952, Serial No. 274,755

5 Claims. (Cl. 137—625.4)

This invention relates to valve structure, and more particularly to a valve structure of the type for controlling the flow of fluid from a plurality of sources to a single outlet.

An object of the invention is to provide a valve structure which is particularly suitable for incorporation in a motor truck fuel transfer system, as shown in patent application Serial No. 276,161, entitled "Fuel Transfer System" filed on March 12, 1952, now abandoned, and assigned to the present assignee, wherein the fuel is stored in a pair of fuel tanks and valve means are provided for placing either one of the tanks in liquid communication with the engine.

Another object is the provision of a novel over-center spring device for yieldably locking the valve stem in either of two positions of adjustment.

Still another object is the provision of new and improved sealing means for closing one end of the valve body which includes a bellows-like rubber cylinder integrally formed with the valve head.

A further object is to provide a simply constructed and extremely durable two-way valve structure.

A still further object is the provision of a valve structure wherein there are no metal parts in sliding relationship within the portion of the valve structure subjected to the fuel.

Figure 2:
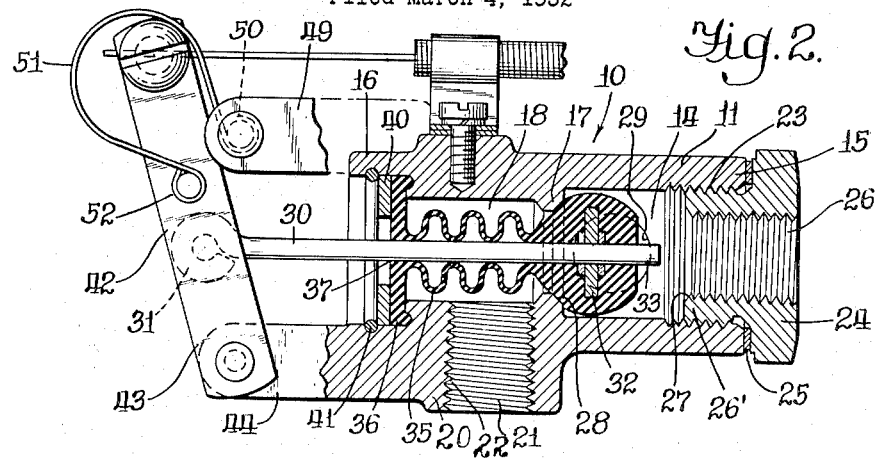
Figure 3:
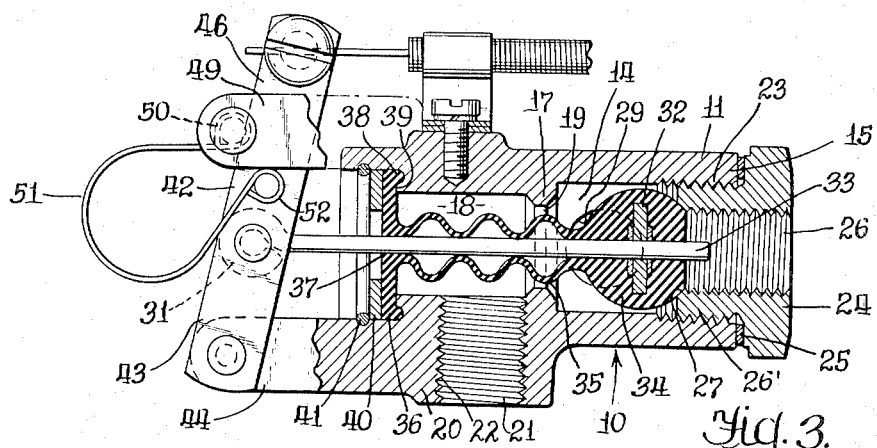
Figure 1:
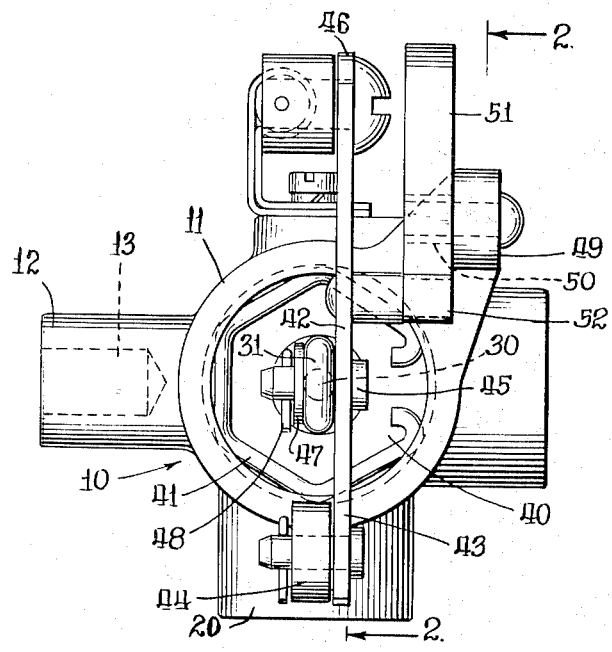

The foregoing and other important objects and desirable features inherent in and encompassed by the invention, together with many of the purposes and uses thereof, will become readily apparent from a reading of the ensuing description in conjunction with the annexed drawings, in which, Figure 1 is an end elevational view of the valve structure;

Figure 2 is a cross-sectional view of the valve structure taken substantially along line 2—2 of Figure 1 showing the valve stem in one position of adjustment; and Figure 3 is a view similar to Figure 2 showing the valve stem in a second position of adjustment.

Referring to the drawings in detail, wherein like reference characters designate like elements throughout the various views, there is shown a valve structure, designated generally by numeral 10. The valve structure 10 includes a generally cylindrically shaped valve body 11 having a pair of axially spaced bosses 12 (only one is shown in Figure 1) projecting from one side thereof. The bosses 12 have threaded recesses 13 for receiving attaching bolts (not shown) to mount the valve structure 10.

As best shown in Figures 2 and 3 a central bore 14 extends axially inwardly from one end 15 of the valve body 11. The bore 14 terminates intermediate the ends 15, 16 of the valve body 11. A radial flange 17 projecting inwardly from the valve body 11 defines the inwardly disposed terminal end of the bore 14. Extending inwardly from the end 16 of the valve body 11 and being in axial alignment with the bore 14 is a second central bore 18 having a smaller diameter than the bore 14. The radial flange 17 is provided with an opening 19 to establish fluid communication between the bores 14 and 18.

Extending through the bottom 20 of the valve body 11 is an inlet passageway 21 which opens into the bore 18. The interior surface 22 of the passageway 21 is threaded for receiving a threaded conduit (not shown). The central bore 14 is threaded along a portion 23 of its length into which a pipe connection 24 is tightly screwed. A sealing washer 25 is interposed between the pipe connection 24 and the valve body end 15 to prevent the leakage of fluid between the parts. As illustrated in Figures 2 and 3, the pipe connection 24 extends into the bore 14 and is provided with a threaded recess 26 for receiving an inlet conduit (not shown). The inwardly disposed end 26' of the pipe connection 24 and the radial flange 17 have oppositely facing beveled surfaces 27 and 28, respectively, formed thereon which serve as valve seats. Fluid is emitted from the valve body 11 through a threaded bore 29 which communicates with the central bore 14 substantially midway between the beveled surfaces 27, 28.

A coaxially disposed valve stem 30 extends through the central bore 18 and terminates within the bore 14. The exteriorly disposed terminal end 31 of the valve stem 30 is in the form of a closed hook, the purpose of which will be described hereinafter, and a plate 32 is rigidly fastened to the valve stem adjacent its opposite terminal end 33 by any suitable means. The valve head 34, in the present invention, comprises a ball-like member which is connected to the valve stem 30 and plate 32 so as to be movable therewith and is made of rubber or a material having like physical characteristics. It will be noted that the diameter of the valve head 34 is less than the diameter of the bore 14 so that the valve head may freely reciprocate within the bore from one position wherein the head abuts the beveled surface 27 and establishes fluid communication between inlet passageway 21 and the bore 29 to a second position wherein the head abuts the beveled surface 28 and establishes fluid communication through the bore 29 and the pipe connection 24.

Integrally formed with the ball-like head 34 is a bellows-like cylinder 35 which is made of the same material as the head. The cylinder 35 extends from the valve head 34 to an integrally-formed radial disk 36 and encloses the valve stem 30. The disk 36 is provided with a central aperture 37 for loosely receiving the valve stem 30. The outer peripheral edge 38 of the disk 36 seals against a shoulder 39 formed by counterboring the bore 18. A washer 40 and a snap ring 41 are employed for maintaining the disk 36 in fluid-tight abutting relationship with the shoulder 39. From the foregoing it will be obvious that the elongatable cylinder 35 and the disk 36 form a fluid-tight seal for the end 16 of the valve body 11.

In order to reciprocate the valve stem 30 between its two positions of adjustment, an actuating lever 42, having one end 43 pivotally connected to a projection 44 extending axially from the valve body 11 and carrying a pivot pin 45 intermediate its ends 43 and 46, is provided. The pivot pin 45 is adapted to extend through the loop-like terminal end 31 of the valve stem 30 and a washer 47 and cotter pin 48 maintain the parts connected whereby swinging of the lever 42 about its connection with the projection 44 will impart reciprocating movement to the valve stem 30.

Vertically spaced above the projection 44 is an offset extension 49 integrally formed with the valve body 11. One end 50 of a bowed leaf spring 51 is pivotally connected to the extension 49 and its opposite end 52 is similarly connected to the actuating lever 42 intermediate the lever end 46 and the pivot pin 45. When the valve stem 30 is in the position shown in Figure 2 the spring 51 urges the lever 42 counter-clockwise to thus maintain the valve head 34 against the beveled surface 28. Conversely, when the lever 42 is in the position shown in Figure 3 the spring force tends to move the lever 42 clockwise forcing the valve head 34 into engagement with the beveled surface 27.

The embodiment of the invention chosen for the purposes of illustration and description herein is the preferred as the result of selective tests based upon requirements for achieving the objects of the invention and developing the utility thereof in the most desirable manner, due regard being had to existing factors of economy, simplicity of design and construction, production methods and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed is:

1. Valve structure comprising: a valve body having a first axial bore formed therein extending inwardly from one end of the body and a second axial bore of smaller diameter and in axial alignment with said first bore extending from the opposite end of the body to said first bore to form a first annular shoulder, said second axial bore being counterbored to form a second annular shoulder; inlet conduit means connected to said body and extending into said first bore to form a third annular shoulder axially spaced from and coaxially with said first and second shoulders; an inlet passageway opening into said second bore intermediate said first and second shoulders; an outlet passageway leading from said first bore intermediate said first and third shoulders; a valve stem extending through said second bore and into said first bore having a ball-like head rigidly secured to the valve stem adjacent one end thereof and disposed within said first bore, the diameter of said head being slightly less than the diameter of said first bore, said stem being axially movable between a first position wherein said head abuts said first shoulder and a second position wherein said head abuts said third shoulder; and sealing means attached to said body opposite said inlet conduit means for closing the end of said second bore opposite said first shoulder including a disc having its peripheral edge confined on said second shoulder and having a central opening for loosely receiving said valve stem, said sealing means further including an elongatable cylinder surrounding said valve stem and extending between and being integrally formed with said disc and said head.

2. The combination as set forth in claim 1, in which said cylinder, head, and disc are composed of a rubber-like substance.

3. Valve structure comprising: a valve body having a first axial bore formed therein extending inwardly from one end of the body, a second axial bore in axial alignment with said first axial bore extending from the opposite end of the body, and an intermediate axial bore of smaller diameter than and extending between said first and second axial bores to form first and second annular shoulders; inlet conduit means connected to said body and extending into said first bore to form a third annular shoulder spaced from and coaxial with said first and second shoulders; an inlet passageway opening into said intermediate bore; and outlet passageway leading from said first bore; a valve stem extending through said second and intermediate bores and into said first bore having a head rigidly attached to the valve stem adjacent one end thereof and disposed within said first bore, said head having a diameter slightly less than the diameter of said first bore, said stem being axially movable between a first position wherein said head abuts said first shoulder and a second position wherein said head abuts said third shoulder; and sealing means for closing the end of said body opposite said first bore including a disc having its peripheral edge abutting said second shoulder and being provided with a central opening through which said valve stem extends, a bellows-like cylinder surrounding said valve stem and extending between and integrally formed with said disc and head, and snap ring means for removably securing said disc to said second shoulder.

4. The combination as set forth in claim 3, in which said disc, cylinder, and head are composed of a rubber-like substance.

5. Actuating means for a valve structure of the type including a valve body having a central axial bore formed therein provided with a pair of axially spaced, coaxial valve seats and a valve stem having a head portion reciprocable to alternatively abut said valve seats, comprising, a lever having one end pivotally connected to the valve body and an intermediate portion thereof pivotally connected to one end of the valve stem, said lever being rockable about an axis through its connection to the valve body between a first position wherein the head portion abuts one of said valve seats and a second position wherein the head portion abuts the other of said valve seats; and resilient means for yieldably maintaining said lever in its first and second positions including a bowed leaf spring having one end pivotally connected to the valve body and its opposite end pivotally connected to said lever, the pivotal connection of said spring to said lever being adapted to cross a line passing through the connections of said lever and spring to said valve body as the lever is moved between its first and second positions.

References Cited in the file of this patent

UNITED STATES PATENTS

| | | |
|---|---|---|
| 347,156 | Bowen | Aug. 10, 1886 |
| 393,536 | Brudin | Nov. 27, 1888 |
| 519,247 | Eiden | May 1, 1894 |
| 582,219 | Mosher | May 11, 1897 |
| 1,070,803 | Harkom | Aug. 19, 1913 |
| 1,779,503 | Swindin | Oct. 28, 1930 |
| 2,019,257 | Gibbs | Oct. 29, 1935 |
| 2,206,957 | Hose | July 9, 1940 |
| 2,329,087 | Russell | Sept. 7, 1943 |
| 2,381,651 | Dickens | Aug. 7, 1945 |
| 2,413,002 | Schurtz | Dec. 24, 1946 |
| 2,422,018 | Hutchinson | June 10, 1947 |
| 2,431,437 | Der Werff | Nov. 25, 1947 |
| 2,477,247 | Haberland | July 26, 1949 |
| 2,485,192 | Eickstaedt | Oct. 18, 1949 |
| 2,653,003 | Overbeke | Sept. 22, 1953 |

FOREIGN PATENTS

| | | |
|---|---|---|
| 668,608 | France | 1929 |
| 277,194 | Italy | 1930 |